W. B. FOWLER.
GLOBE-VALVE.

No. 188,289. Patented March 13, 1877.

Witnesses
S. U. Piper
L. W. Miller

Walter B. Fowler
by his attorney

UNITED STATES PATENT OFFICE.

WALTER B. FOWLER, OF LAWRENCE, MASSACHUSETTS.

IMPROVEMENT IN GLOBE-VALVES.

Specification forming part of Letters Patent No. 188,289, dated March 13, 1877; application filed April 5, 1876.

*To all whom it may concern:*

Be it known that I, WALTER B. FOWLER, of Lawrence, of the county of Essex and State of Massachusetts, have invented a new and useful Improvement in Globe-Valves or Gage-Cocks; and do hereby declare the same to be fully described in the following specification, and represented in the accompanying drawings, of which—

Figure 1:
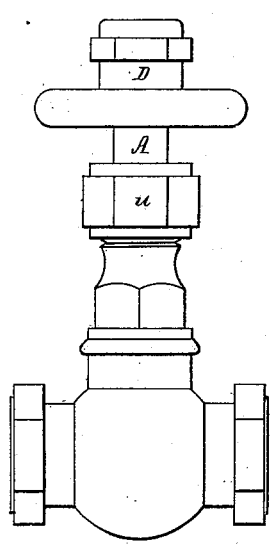
Figure 2:
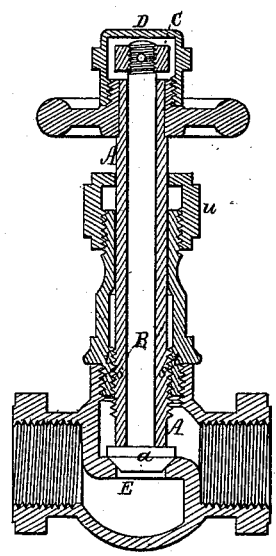

Figure 1 is an external view, and Fig. 2 a vertical section, of a valve or cock provided with my invention.

In carrying out my improvement, I construct the main rotary screw-stem A of the valve a of the cock tubular, and, instead of fastening the said valve to such stem, I secure it to an auxiliary stem, B, to pass up through and slide in the bore of the main stem. On the upper end of the auxiliary stem I screw a nut, C, and cover the same by a screw-cap, D, screwed on the upper end of the main stem. The said screw-cap is chambered to allow the auxiliary spindle or stem to play up and down within the main stem, in order that the cock may be used as a check-valve, as well as a gage-cock.

With my improvement the valve can readily be ground to its seat E, to accomplish such it being only necessary to revolve the auxiliary stem, so as to press the valve against, and turn it on, the said seat, a suitable abrasive material or grinding-matter being interposed between the valve and its seat.

With a common gage-cock, having the valve fixed directly to the stem, provided with a screw for moving such stem lengthwise, while it may be revolved, the valve cannot be ground to its seat by revolving the stem when it is in connection with the valve-case, as the screw will prevent such.

The main stem of my improved cock, when screwed down sufficiently, will close the valve, and, on being revolved back, will, by acting against the nut of the auxiliary stem, raise the valve off its seat. As the distance between the valve and the nut of its stem is greater than the length of the screw-stem, the valve can act as a check-valve. My improved gage-cock, thus combining the advantage of the globe and check valves, renders unnecessary one of such as generally used with a boiler.

In the drawings, the female screw for reception of the male screw s of the main stem is shown at t, the stuffing-box for such stem to slide in being represented at u, all being such as are in common use in ordinary globe-valve or gage cocks. By having the cap D chambered, and the stem B provided with the nut C, arranged, as shown, in the chamber of the said cap, and projecting over the upper end of the tubular stem A, and by having longer than the stem A that part of the stem B which is between the valve a and the nut C, an important advantage is gained—that is to say, not only can the stem A be raised so as to allow the valve to act as a check-valve, but said valve may be either forced down upon its seat by the stem A, or raised off such seat by the said stem and the nut C.

I claim in the globe-valve as follows, viz:

1. The combination of the nut C with the auxiliary stem B, the valve a, and the tubular screw-stem A, all arranged and applied substantially as specified.

2. The combination of the chambered screw-cap D, the auxiliary stem B, the valve a, and the tubular main screw-stem A, all arranged and applied substantially as set forth.

3. The combination of the chambered screw-cap D, the nut C, the auxiliary stem B, the valve a, and the tubular main screw-stem A, all arranged and applied together and to the case and the stuffing-box of the cock, as represented.

WALTER B. FOWLER.

Witnesses:
R. H. EDDY,
J. R. SNOW.